United States Patent Office 3,328,458
Patented June 27, 1967

3,328,458
PURIFICATION OF NITRILES
Vincent J. Iappelli, Lodi, and Seymour Sobel, Cedar Grove, N.J., assignors to Universal Oil Products Company, Des Plaines, Ill., a corporation of Delaware
No Drawing. Filed Sept. 10, 1964, Ser. No. 395,574
6 Claims. (Cl. 260—465.1)

ABSTRACT OF THE DISCLOSURE

Removal of hydrogen cyanide and water from nitrile solutions by simultaneous treatment with a copper acetate or silver nitrate and with calcium chloride, sodium sulfate or alumina.

This invention relates to the purification of nitriles and more particularly to a process for the purification of water soluble nitriles by the removal of water and hydrogen cyanide therefrom.

Nitriles are valuable compounds having utility in many chemical fields. Frequently, however, nitriles exist in admixture with contaminants such as water and hydrogen cyanide which preclude their use in many applications where highly pure nitriles are required. Accordingly, to render nitriles suitable for such applications, it is necessary to remove these contaminants therefrom.

The removal of contaminants such as water and hydrogen cyanide from nitriles, in particular water soluble nitriles such as acetonitrile, is not, however, readily effected by usual separational methods. This is especially the case when the contaminants are to be removed to a substantial extent where only very small quantities remain in admixture with the nitriles of the order of about 1 percent by weight of water and less than about 20 parts per million by weight of hydrogen cyanide. Distillation, for example, is not suitable for effecting such a separation because water soluble nitriles, such as acetonitrile, are highly soluble in water and form constant boiling mixtures or azeotropic mixtures with water which preclude obtaining nitrile mixtures having a water content of less than about 16 percent by weight. Moreover, the presence of hydrogen cyanide further renders distillation unsatisfactory because hydrogen cyanide is highly soluble in both water as well as in the water soluble nitriles and because hydrogen cyanide becomes hazardous to health when heated during distillation. Separational methods other than distillation are similarly unsatisfactory, especially when attempting to remove water and hydrogen cyanide to the extremely low levels required for many nitrile applications.

It has now been discovered, however, that contaminants such as water and hydrogen cyanide can be removed from a water soluble nitrile mixture, and most importantly to very low levels, in a one step treatment which is both simple and economical to carry out. These particularly desirable results are achieved according to the process of this invention by treating a water soluble nitrile mixture containing the contaminants of water and hydrogen cyanide with a drying agent and a compound capable of forming a water soluble, cyanide salt with hydrogen cyanide, followed by recovery of the nitrile-rich, substantially water and hydrogen cyanide free organic layer from the resulting mixture.

Accordingly, it is an object of this invention to provide a process for removing water and hydrogen cyanide from water soluble nitriles. Another object is to provide a process for separating water and hydrogen cyanide from water soluble nitriles which is both simple and economical to carry out. A still further object is to provide a process for removing water and hydrogen cyanide from water soluble nitriles whereby substantially all of the water and hydrogen cyanide is removed.

In general, almost any water soluble nitrile can be effectively treated by the process of this invention to remove substantially all of the water and hydrogen cyanide therefrom. Such nitriles include for example, acetonitrile, propionitrile, butyronitrile, valeronitrile or any mixtures thereof. The nitrile treated is contained in solution in mixture with the water and hydrogen cyanide. This mixture may contain other substances such as alcohols, ammonia or pyridine bases, but the presence of these materials does not interfere with the separation of the water and the hydrogen cyanide according to the process of this invention.

In general, there is nothing critical about the quantities of water and hydrogen cyanide initially present in the mixture. However, the nitrile mixtures most advantageously treated by the process of this invention generally do not contain, initially, substantially more than about 16 percent by weight of water and about 5000 parts per million by weight of hydrogen cyanide. Other separational methods can be satisfactorily used to remove the contaminants to these levels, but these other methods generally are not capable of satisfactorily removing the water and hydrogen cyanide to levels below these values and especially not to levels of the order of about 1 percent by weight of water and less than about 20 parts per million by weight of hydrogen cyanide. It is for this reason that the nitrile mixtures treated by the process of this invention usually have initially only up to about 16 percent of water and 5000 parts per million of hydrogen cyanide. It is to be understood, however, that nitrile mixtures containing water and hydrogen cyanide above about 16 percent and 5000 parts per million by weight, respectively, may be treated by the process of this invention, but from the standpoint of commercial feasibility, the nitrile mixtures treated generally do not initially contain the contaminants above these levels.

As hereinbefore indicated, the water and hydrogen cyanide are removed from a nitrile mixture according to this invention by treating the mixture in a one step procedure with a drying agent and a compound capable of forming a water soluble, cyanide salt with hydrogen cyanide, followed by recovery of the nitrile-rich organic layer of the resulting mixture. The drying agents which may be used in the process include such materials as calcium chloride, sodium sulfate or alumina, although the results achieved in each case differ widely. The preferred drying agent is anhydrous calcium chloride and the amount used will depend primarily upon the amount of water present. Generally, sufficient calcium chloride is added to the mixture to form a supersaturated solution with amounts ranging from about 2 to 10 percent by weight of the nitrile mixture being satisfacotry in most instances. Included within the group of compounds capable of forming a water soluble, cyanide salt which may be used in combination with the drying agent in the process of this invention to achieve the desired separation are such compounds as the copper acetates or silver nitrate. The preferred compound is cupric acetate and the most desirable results are achieved when using this compound in combination with calcium chloride. The amount of cupric acetate used will vary and is dependent primarily upon the quantity of hydrogen cyanide present with amounts ranging from about 0.1 to 10 percent by weight of the nitrile mixture being satisfactory in most instances.

The separation of the hydrogen cyanide is effected in the process of the invention by virtue of its conversion to a water soluble salt which is then preferentially solubilized in the aqueous layer formed during the treatment. This aqueous layer of the treated mixture is substantially nonmiscible with the nitrile-rich, organic layer of the treated mixture and thus separation of the aqueous layer containing a major proportion of the water and hydrogen cyanide originally contained in the nitrile mixture is readily achieved. Since the aqueous layer, which is necessary for the separation, is formed during the treatment by the action of the drying agent with the water contained in the nitrile mixture, it is essential for the separation that both the drying agent and the compound capable of forming a cyanide salt be in contact with the nitrile mixture at the same time.

The conditions under which the treatment of this invention is effected are not critical and may be widely varied with relatively comparable results. In general, the temperatures utilized need only be sufficiently high, of the order of about 25° C., to insure adequate dissolving of the drying agent and adequate formation of the water soluble cyanide salt by reaction of the hydrogen cyanide with the compound capable of forming a water soluble, cyanide salt. Substantially elevated temperatures of above about 100° C. should be avoided, however, because the miscibility of the aqueous and the organic layers of the resultant, treated mixture is adversely affected at elevated temperatures with the result that there is a lowering of he desired degree of separation. The time required for the contacting of the nitrile mixture with the drying agent and the compound capable of forming a water soluble cyanide salt will vary and is dependent upon the degree of mixing and quantities of contaminants present. The time of contacting, however, should be sufficiently long so as to permit adequate interaction of the added materials and the nitrile mixture and hence form the nitrile-rich, organic layer and the aqueous layer in the resultant treated mixture. Periods of contacting of from about one to fifteen hours will be satisfactory in most instances. The pressures employed must be sufficient to maintain the nitrile mixture in liquid phase at the particular temperature utilized. However, since the temperatures are usually not substantially elevated, atmospheric pressures are in most instances satisfactory.

The process of this invention may be conducted in a batch, continuous or semicontinuous type of operation. The only critical requirement in conducting the process by any of these methods is that there is adequate contacting of the nitrile mixture with the drying agent and the compound capable of forming a water soluble cyanide salt so that the two liquid layers can form in the resulting mixture whereby the desired separation is effected. Preferably a batch operation is utilized for the treatment and may be illustrated as follows: A nitrile mixture containing water and hydrogen cyanide, is charged to a suitable vessel. The drying agent and the compound capable of forming a water soluble, cyanide salt with hydrogen cyanide such as the preferred calcium chloride and cupric acetate, respectively, are then added and mixed with the nitrile mixture. The temperature of the mixture is not critical, and the simplicity of the process is typified by the fact that elevated temperatures need not be utilized, with ambient temperatures of about 25° C. being utilized. After the nitrile mixture and added materials have been stirred for a time sufficient to insure adequate contacting, the mixing is stopped and the resultant mixture allowed to stand for a time sufficient to permit two distinct liquid layers to form. The upper organic layer containing the nitrile and a substantially reduced amount of water and hydrogen cyanide is separated by ordinary means such as decantation from the lower aqueous layer which contains a major proportion of the water and hydrogen cyanide initially contained in the nitrile mixture.

The following detailed example is submitted for the purpose of illustrating a mode of carrying out the process of this invention. It is to be understood that the invention is not to be considered as limited to the specific conditions of operations set forth therein.

*Example*

About 3000 grams of an acetonitrile mixture containing water and hydrogen cyanide were charged to a vessel equipped with stirring means. While the mixture was stirred, about 120 grams of anhydrous calcium chloride and about 9 grams of cupric acetate were added. After completion of the addition, the mixing was continued for about 3 hours. The temperature of the mixture during the treatment was about 25° C. Upon standing, the mixture separated into an upper organic layer, rich in acetonitrile and a lower, aqueous layer. The organic layer was recovered by decantation, mixed with a small amount of calcium hydroxide to neutralize any acetic acid formed, and distilled to recover an acetonitrile mixture containing substantially reduced amounts of water and hydrogen cyanide. The results obtained were as follows:

| Material | Concentration water, wt. percent | Concentration HCN, parts per million |
| --- | --- | --- |
| Initial mixture | 4.8 | 136 |
| Treated mixture | 1.0 | 17 |

We claim as our invention:

1. A process for the purification of a solution containing hydrogen cyanide and water in admixture with acetonitrile, propionitrile, butyronitrile or valeronitrile, which comprises contacting said solution in liquid phase simultaneously with a copper acetate or silver nitrate and with calcium chloride, sodium sulfate or alumina in sufficient amounts to separate hydrogen cyanide and water from said nitrile and form a nitrile-rich phase substantially free of hydrogen cyanide and water, and recovering said nitrile-rich phase.

2. The process of claim 1 further characterized in that said solution is contacted with calcium chloride and cupric acetate.

3. A process for the purification of a solution containing hydrogen cyanide and water in admixture with acetonitrile, which comprises contacting said solution in liquid phase simultaneously with a copper acetate or silver nitrate and with calcium chloride, sodium sulfate or alumina in sufficient amounts to separate hydrogen cyanide and water from said nitrile and form a nitrile-rich phase substantially free of hydrogen cyanide and water, and recovering said nitrile-rich phase.

4. The process of claim 3 further characterized in that said solution is contacted with calcium chloride and cupric acetate.

5. A process for removing water and hydrogen cyanide from an aqueous solution containing water in an amount of up to about 16 weight percent and hydrogen cyanide in an amount of up to about 5000 weight parts per million and acetonitrile, propionitrile, butyronitrile or valeronitrile, which comprises contacting said solution simultaneously with calcium chloride, alumina or sodium sulfate in an amount of from about 2 to 10 weight percent and with a copper acetate of silver nitrate in an amount of from about 0.1 to 10 weight percent, said contacting being effected in liquid phase for from about 1 to 15 hours at atmospheric pressure and at a temperature of from about 25° to 100° C., thereafter separating the resulting aqueous phase and recovering the nitrile-rich phase substantially free of the hydrogen cyanide and water.

6. The process of claim 5 further characterized in that said solution is contacted with calcium chloride and cupric acetate.

References Cited
UNITED STATES PATENTS

| | | | |
|---|---|---|---|
| 2,351,157 | 6/1944 | Semon | 260—465.1 X |
| 2,560,931 | 7/1951 | Chapman et al. | 260—465.1 X |
| 3,201,451 | 8/1965 | Idol et al. | 260—465.3 |
| 3,203,975 | 8/1965 | Sobel et al. | 260—465.1 |

CHARLES B. PARKER, *Primary Examiner.*

JOSEPH P. BRUST, *Examiner.*